United States Patent [19]
Oskarsson et al.

[11] Patent Number: 4,869,974
[45] Date of Patent: Sep. 26, 1989

[54] PROTECTING PLATE OF COMPOUND DESIGN AND METHOD OF MANUFACTURING THE SAME

[75] Inventors: Rolf G. Oskarsson, Rönninge; Erik G. Eriksson, Sandviken, both of Sweden

[73] Assignee: Sandvik AB, Sandviken, Sweden

[21] Appl. No.: 90,900

[22] Filed: Aug. 31, 1987

[30] Foreign Application Priority Data

Sep. 1, 1986 [SE] Sweden .................. 8603663

[51] Int. Cl.⁴ .................. B22F 3/00; C22C 29/00
[52] U.S. Cl. .................. 428/328; 428/469; 428/698
[58] Field of Search ............. 428/698, 699, 469, 472, 428/323, 328

[56] References Cited

U.S. PATENT DOCUMENTS

| | | | |
|---|---|---|---|
| 3,189,477 | 6/1965 | Shaffer | 428/698 X |
| 3,507,633 | 4/1970 | Dewez | 428/698 X |
| 3,771,976 | 11/1973 | Wakefield | 428/698 X |
| 3,816,081 | 1/1973 | Hale | 29/182.7 |
| 3,895,923 | 7/1975 | Wakefield | 428/698 X |
| 4,056,517 | 2/1976 | Albers et al. | 260/79.3 |
| 4,082,559 | 1/1977 | Mishuku et al. | 106/43 |
| 4,143,208 | 11/1976 | Aslund | 428/558 |
| 4,145,213 | 5/1976 | Oskarsson et al. | 75/238 |
| 4,162,392 | 7/1977 | Brown et al. | 219/146.51 |
| 4,300,952 | 2/1979 | Ingelström et al. | 75/238 |
| 4,374,685 | 2/1983 | Suzuki et al. | 148/126.1 |
| 4,563,215 | 1/1986 | Yamamoto et al. | 75/238 |
| 4,618,540 | 10/1986 | von Holst et al. | 428/552 |

FOREIGN PATENT DOCUMENTS

| | | |
|---|---|---|
| 932342 | 8/1973 | Canada . |
| 0046209 | 2/1982 | European Pat. Off. . |
| 55-44533 | 3/1980 | Japan . |
| 407781 | 3/1934 | United Kingdom . |

*Primary Examiner*—Nancy A. B. Swisher
*Attorney, Agent, or Firm*—Burns, Doane, Swecker & Mathis

[57] ABSTRACT

According to the invention there is now provided a protecting plate in compound design for use such as splinter screen, composite armour etc. Said plate comprises elements built of alternate lamellas of a hard material rich in hard constituents and a tough material with a superior metallugical bond between the lamellas. The hard material comprises particles such as carbides, nitrides, oxides and/or borides of Ti, Zr, Hf, V, Nb, Ta, Cr, Mo, W, and/or Al in a matrix based on Fe, Co and/or Ni where the amount of hard constituents is 30–70 vol-% and the tough material essentially comprises Fe, Co and/or Ni base alloys, preferably steel.

5 Claims, 6 Drawing Sheets

PROTECTING PLATE OF COMPOUND DESIGN AND METHOD OF MANUFACTURING THE SAME

The present invention relates to protecting plates such as splinter screens, composite armor and the like.

Composite splinter screens have been met with great interest lately mainly because they can be used in the so called light armor for personal protection, e.g., bullet proof jackets, etc. Among the types on the market are combinations such as plastic-ceramics (the ceramic being, e.g., alumina), aluminium-alumina and composites built up of fibers such as graphite. The intention of these composites is to combine a hard (and brittle) material, which takes up the impulse, with a tough material which keeps the construction together and prevents the hardmaterial from bursting when hit. More exactly, the purpose of the hardmaterial is to splinter the bullets and that of the tough material to catch the splinters and keep the material together.

The present invention supplements the above mentioned composites. It relates to composite elements that can be built up in several steps from those which protect from hand guns to more coarse constructions. The intention of the present invention is to cover the gap between the above mentioned 'light armor' and normal using the advantages available from composites. The invention is characterised in that it comprises elements built up by alternate lamellas of a material rich in hard constituents and of a tough material respectively characterized by superior, metallurgical bond between the lamellas.

The material rich in hard constituents (hereinafter called hard material) comprises hard constituents of carbides, nitrides, oxides, borides, silicides, carbonitrides, oxycarbides, oxynitrides, oxycarbonitrides, etc, of Ti, Zr, Hf, V, Nb, Ta, Cr, Mo, W and/or Al in a matrix based on Fe, Ni and/or Co. The amount of hard constituents is 30–70 vol-%. The particles of the hard constituents in the hardmaterial are generally submicron i.e. the grain size is $<1$ $\mu$m. Such hardmaterials are previously known for other applications e.g. U.S. Pat. Nos. 4,145,213 and 4,618,540. Due to their structure, such hardmaterials can be given an essentially lower density than conventional armour. On the other hand, a higher density can also be obtained by using a high proportion of WC. It is not possible to reach the density levels of previously mentioned light weight composites and it is not the intention either.

The tougher material of the composite elements, which essentially is comprised of a Fe, Co and/or Ni based alloy, preferably steel, is chosen depending on what elements the protecting plates are intended to cooperate with. If the elements are to be welded to a device or if packages of a large number of elements are to be built by welding, a weldable steel is preferably chosen. The degrees of freedom are not unlimited since it must be kept in mind that the hardmaterial and the tough material are compatible enough e.g. regarding thermal expansion and phase transformation temperatures, so that dangerous tensions leading to cracks are not built in.

A suitable difference in thermal expansion can be used with advantage. Since hardmaterials generally have lower thermal expansion than pure metallic materials, compressive stresses can be built in the hardmaterial which due to its higher hardness has a more brittle behavior. In this way, a favorable effect is obtained since, at the same hardness level, the brittle behavior can be suppressed by the prestress imparted to the composite element.

The superior, metallurgical bond between the alternating lamellas in the elements is obtained by combining the hardmaterial and the tough material in a process comprising considerable plastic working. To combine two solid materials has proved to be extremely difficult to master practically due to the extremely high demand on clean surfaces. If, instead, the hardmaterial is present in form of new powder, active surfaces are continuously created during the compaction process. Extrusion has turned out to be a suitable compaction process. The degree of working is important. It has turned out that an extrusion ratio of at least six, preferably at least eight, calculated on the material in powder form is needed to get a good bond. (The extrusion ratio is defined as the initial area of the powder body relative to the final area of the dense body previously consisting of powder). Also, the tough material can be in powder form before the extrusion but it is not necessary in order to get a good bond. To have the tough material in powder form improves the bond, of course, since a mixed zone between the two materials is obtained and, thus, a rougher surface.

That the bond between the two material types is extremely good, when the above described method has been used, has been proved by compatibility test when testing the amount of differences in thermal expansion which can be tolerated without exceeding the critical stress so that the material cracks. When the allowed limit has been exceeded, the cracks have always appeared some millimeters inside the hardmaterial and not in the joint itself.

When extruding, one normally starts from round extrusion blanks, where hardmaterial powder has been placed in various ways in order to obtain the desired profiles and the desired distribution of hard and tough material resp, i.e. lamella packages as described above. Various configurations which will be described later in the form of examples are shown in FIGS. No 1 to 6. The desired profiles for the application of the present invention are generally not round bar but more complicated profiles, particularly what is to be regarded as flat profile. This means a considerably more complicated extrusion process. It has surprisingly enough been found possible to extrude, with good tolerance, flat profiles with a ratio of width/height $>7$, in some cases $>9$–$10$, starting from a round extrusion blank consisting of about 50 vol-% tough material and of about 50 vol-% hardmaterial (with 30–70 vol-% hard constituents) relative to dense material. This means that with an extrusion press with a billet cylinder of 80 mm diameter, a cylindrical blank 76 mm diameter (cold measure to manage the heating without risk of sticking due to oxide scale formation or other) has been manufactured and that from this a bar with a cross section of $45\times5$ mm has been extruded with success. The dimensional limitations for this extrusion press considered primarily in that due to the shape of the die, the tools do not allow greater dimensions than what is possible to inscribe in a circle 47 mm diameter. This whole area is not available due to the requirement on the extrusion ratio discussed previously.

The extrusion press with a cylindrical billet of 65 or 80 mm diameter (mentioned above) has an available force of 600 tons. Other larger presses tested are e.g 1700 tons extrusion press with a cylinder billet of 143 mm diameter and with maximum extruded dimension 65 mm diameter (inscribed circle) and 3000 tons extrusion press with a cylindrical billet from 195 to maximum 345 mm diameter and with corresponding maximum dimension for extruded bar of 125 mm diameter and 260 mm diameter (inscribed circle), respectively.

By choosing a matrix for the hard material that is heat treatable and combining this with various forms of steel, elements according to the invention with alternating lamellas of varying hardness can be obtained. If e.g. titanium nitride is used as the hard constituent in the hardmaterial, it is possible, by varying particularly the carbon content but also the other alloying elements such as chromium and molybdenum and then adapting the heat treatment to the chosen matrix to obtain a hardmaterial with the hardness 800–900 or 1200–1300 HV for only one volume content of hard constituents e.g. 50 vol-%. Because of the fine grain size of the hard constituents and even distribution of the same, a great variation in hardness can be obtained at the same time as Young's modulus is almost constant (about 300 000 N/mm$^2$ for 50 vol-% fine grain TiN). If the hardmaterial, which can be given great variations in hardness, is combined with a steel, heat treated in the same way as the hardmaterial (and taking place at the same time by, e.g., tempering,) can be given hardness levels about 200–300 or 500–600 HV, sandwich constructions can be obtained with alternate lamellas with, e.g, hardness of 950 and 550 HV and 1200 and 300 HV resp. i.e. about the same macrohardness but with essential differences in microhardness depending on what is desired.

Below are given some examples of the geometrical shapes obtained by various combinations of the geometry of the blank and the location of the hardmaterial and the shape of the extrusion die and the orientation of the blank relative to it.

FIG. 6 is illustrative of the extrusion blank described in Example 6" to

Figure 1A:
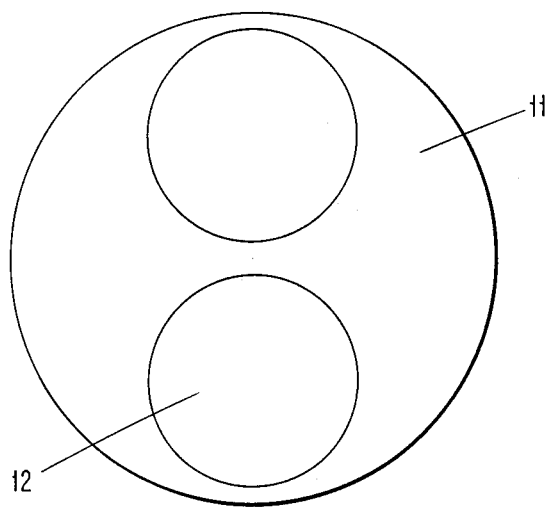
FIG. 1 is illustrative of the extrusion blank described in Example 1.
Figure 1B:
Figure 1C:
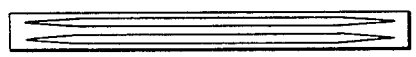

FIGS. 1a, 1b, and 1c are illustrative of the extrusion

Figure 2A:
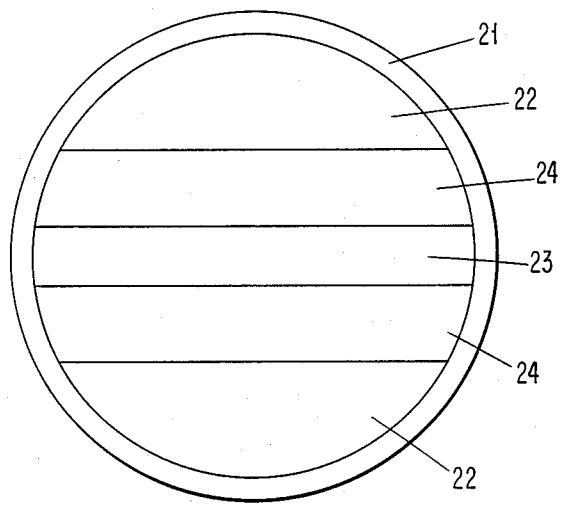
FIG. 2 is illustrative of the extrusion blank described in Example 2.
Figure 2B:
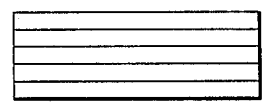
Figure 2C:
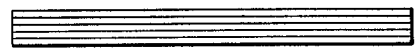
Figure 3A:
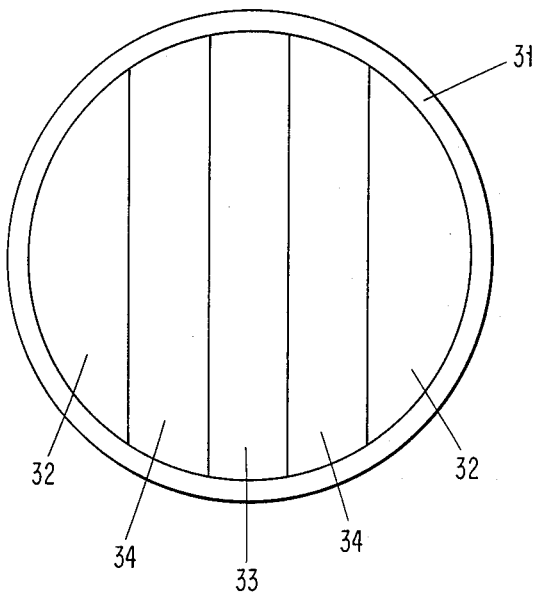
FIG. 3 is illustrative of the extrusion blank described in Example 3.
Figure 4A:
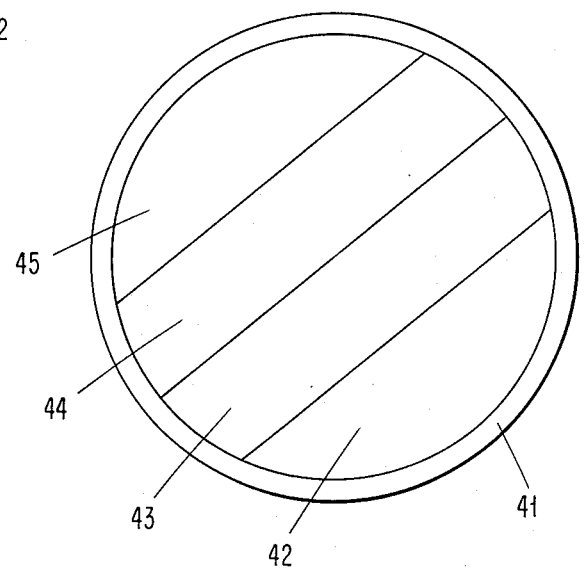
FIG. 4 is illustrative of the extrusion blank described in Example 4.
Figure 3B:
Figure 4B:
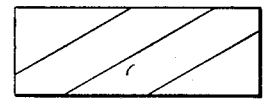
Figure 5A:
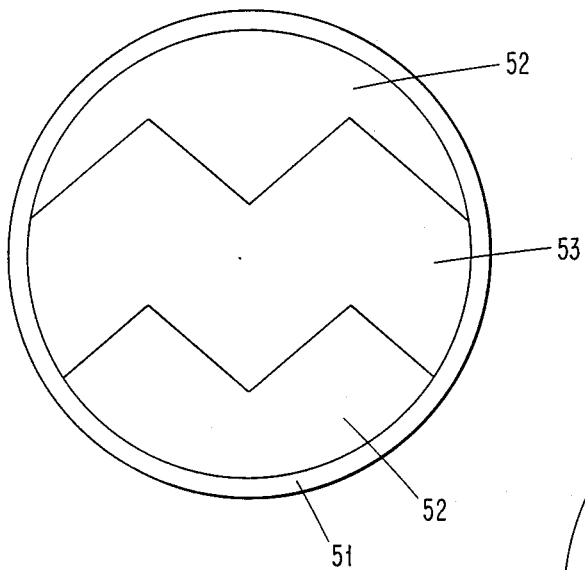
FIG. 5 is illustrative of the extrusion blank described in Example 5.
Figure 6A:
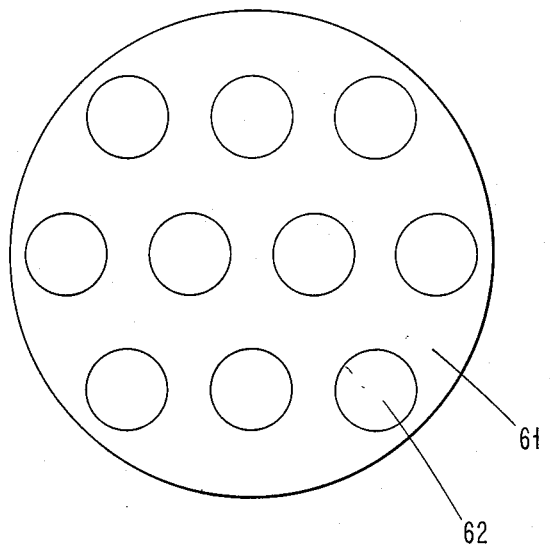
Figure 5B:
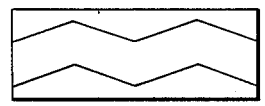
Figure 5C:
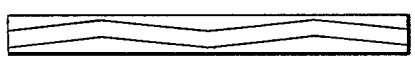
Figure 6B:
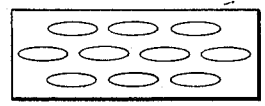
Figure 6C:

FIGS. 2a, 2b, and 2c are illustrative of the extrusion blank described in Example 2;

FIGS. 3a and 3b are illustrative of the extrusion blank described in Example 3;

FIGS. 4a and 4b are illustrative of the extrusion blank described in Example 4;

FIGS. 5a, 5b, and 5c are illustrative of the extrusion blank described in Example 5; and FIGS. 6a, 6b, and 6c are illustrative of the extrusion blank described in Example 6.

EXAMPLE 1

Extrusion blanks were made by drilling two holes in a steel blank 76×300 mm diameter (11) of SS 2244 according to FIG. 1a and filling these holes with hardmaterial in powder form comprising 50 vol-% submicron TiN in a heat treatable matrix (12) and closing the blank with a steel plate 76×50 mm diameter also SS 2244, in each end by welding. The thickness of the front plate is explained by the fact that the extrusion must float before the hardmaterial is engaged and that of the end plate by material losses in the form of hardmaterial in the 'discard' (extrusion rest). The sharp edge on the front of the blank was rounded to a radius of curvature of r=10 mm. The thus obtained extrusion blanks were heated in protective gas (N$_2$) to 1150° C. whereafter they were extruded through a die 40×15 mm. This flat profile (FIG. 1b) was rolled at 1150° C. in two passages between open rolls to a band 66×5 mm, whereby a cross section was obtained according to FIG. 1c.

The hardmaterial can either be added in the form of powder or e.g. of cold isostatically pressed bars. The latter gives higher yield and, of course, other relative dimensions of hardmaterial-steel lamellas.

EXAMPLE 2

In a tube 76 diameter×70 diameter×300 mm of SS 2172 (21) circle segments also of SS 2172 (22) and a central segment (23) of the same material were placed. The steel parts were carefully degreased and blasted. Between the circle segments and the central segment hardmaterial according to previous Example (24) were placed. This is illustrated in FIG. 2a. Closing and forming to an extrusion blank was performed in the same way as in the preceding Example. Also the extrusion was performed in the same way and a banded flat profile was obtained, see FIG. 2b. (Note that the outer capsule is not included in the sketch). Also this profile could be rolled to a band 65×5 mm according to FIG. 2c.

The same extrusion blank can with advantage be produced also with the steel lamellas in powder form. The powder filling is then preformed with the aid of 'sliding molds' which are retracted as the filling takes place. The powder blank is preferably produced by cold isostatic pressing.

EXAMPLE 3

By making the same construction as in Example 2 regarding the extrusion blank, but placing the blank turned 90 degrees relative to the extrusion die compared to the preceding Example, a flat profile was obtained where the alternating lamellas are placed in reverse way compared to what earlier has been shown, see FIGS. 3a and 3b. (31=outer tube, 32=circle segment steel, 33=middle segment steel, 34=hardmaterial)

EXAMPLE 4

The corresponding extrusion blank as in the two preceding Examples, however, with one lamella less and turned 45 degrees relative to both, see FIGS. 4a and 4b, gives corresponding 'inclined' location of the alternate lamellas hardmaterial-tough steel. Due to the greater resistance of the hardmaterial against the extrusion process a tendency of the hardmaterial was noted here to align relative to the extrusion die in order to reduce the extrusion resistance. (41=outer tube, 42 and 44=steel, 43 and 45=hardmaterial)

EXAMPLE 5

Broken lamellas instead of straight ones give as is evident from FIGS. 5a, 5b, and 5c also broken lamellas in the extruded material even if a certain rounding and softening of the relatively sharp profiles in the extrusion blank takes place. This rounding is even more pronounced after rolling, see FIG. 5c (52=outer tube, 52=steel, 53=hardmaterial)

EXAMPLE 6

By drilling a number of holes in a cylindrical blank and filling the holes with hardmaterial and producing an extrusion blank according to Example 1 and extruding this blank through a rectangular extrusion die, systems of alternate lamellas hardmaterial-steel were obtained in a simple way (within the geometric limits set by a round extrusion blank, the location of the holes and the design of the extrusion die). FIG. 6 shows a blank where holes have been drilled and filled with hardmaterial (6a) and extruded (6b) and rolled (6c). (61=steel, 62=hardmaterial)

We claim:

1. A protecting plate of compound design comprising elements built up of alternating lamellas of hard material and tough material, said lamellas being bonded together with metallurgical bonds between the various lamellas, wherein the hard material comprises particles of hard constituents selected from at least one of carbides, nitrides, oxides and borides of at least one of Ti, Zr, Hf, V, Nb, Ta, Cr, Mo, W, and Al in a metallic matrix based on at least one of Fe, Co and Ni, the amount of hard constituents being from 30–70 vol-%, and wherein the tough material comprises at least one of Fe, Co and Ni based alloys.

2. A protecting plate according to claim 1 wherein the hard constituent particles of the hardmaterial are submicron sized.

3. A protecting plate according to claim 1 wherein the tough material is a steel alloy.

4. A protecting plate according to claim 1 wherein the hard constituent is primarily titanium nitride.

5. A protecting plate according to claim 3 wherein the hard constituent is primarily titanium nitride.

* * * * *